Oct. 9, 1962 G. WILKES 3,058,028
THERMIONIC TYPE DETECTOR FOR MICROWAVE SIGNALS
Filed May 24, 1948 2 Sheets-Sheet 1

INVENTOR.
GILBERT WILKES
BY
ATTORNEY

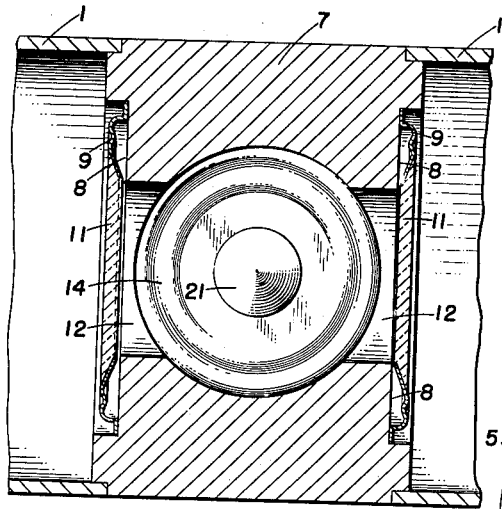
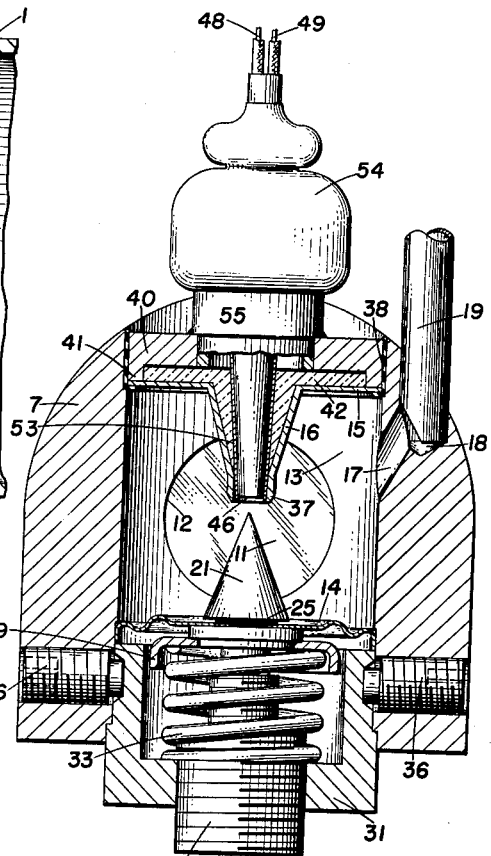

United States Patent Office 3,058,028
Patented Oct. 9, 1962

3,058,028
THERMIONIC TYPE DETECTOR FOR MICROWAVE SIGNALS
Gilbert Wilkes, Chevy Chase, Md., assignor to the United States of America as represented by the Secretary of the Navy
Filed May 24, 1948, Ser. No. 28,953
8 Claims. (Cl. 315—39)

The present invention relates to an electrical detector, particularly for use in receiving ultra-high-frequency radio signals. More specifically it relates to a detector of the thermionic type for use in detecting signals in the radar frequency range.

Heretofore it has been customary to make use of crystal type detectors in receiving microwave radio signals. Such crystal detectors have a number of disadvantages, such as relatively low sensitivity, lack of inherent amplification, and liability to damage or destruction when subjected to abnormally strong signals. Ordinary types of three-element tubes and similar devices, however, are not adaptable to use for the detection of microwave signals, hence no better means than such crystals have hitherto been available for the purpose.

An object of the present invention is to provide a multi-electrode thermionic device suitable for use as a detector for microwave signals.

A further object is to provide a thermionic detector that may be substituted for the crystal detectors now in use, to secure increased sensitivity, greater ruggedness, and immunity to injury by abnormally powerful received signals.

Another object is to provide a device that may combine a local oscillator and mixer resonant cavity with detector means so as to operate as a superheterodyne receiver.

An additional object is to provide a device that may combine in one resonant cavity the elements of a regenerative receiver.

Still another object is to provide a triode detector which, when connected properly to the usual amplifier, will make possible the effective use of automatic gain control in radar apparatus, with the overall result that overloading of the detector and first amplifier stage will be prevented.

Other objects and many of the attendant advantages of this invention will be appreciated readily as the invention becomes understood by reference to the following detailed description, when considered in connection with the accompanying drawings, wherein:

FIG. 3 is a fragmentary detail, in section on the plane 3—3 of FIG. 2, with the conical anode and its flexible support shown in plan;

FIG. 4 is a cross section through the detector, on the plane 4—4 of FIG. 2, with certain parts in elevation;

FIG. 5 is a fragmentary, somewhat diagrammatic, illustration of an axial section through the grid and cathode structure, on a very much enlarged scale; and FIG. 6 is a diagram illustrating one possible way of connecting the detector into a receiving circuit.

As shown, the detector is built into a wave guide. It will be seen that the structure is considerably different from that of the conventional three-element, general purpose, vacuum tube, in that the evacuated chamber in the present device serves also to form a resonant cavity in the wave guide, in place of having merely a more or less arbitrary shape and size. Owing to the extremely high frequency at which the detector operates, it would not, in general, be possible to utilize the ordinary triode, or other type of thermionic tube, especially in view of other requirements the detector must meet.

Figure 1:
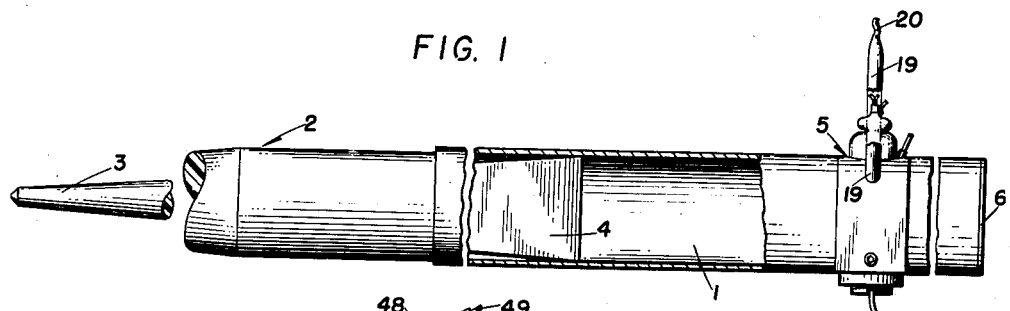
FIG. 1 is a side elevation, partly in vertical axial section, and with parts broken away, showing a portion of a wave guide, equipped with a dielectric lens and with the detector embodying the invention and built into said wave guide.

Referring first to FIG. 1, there is shown a wave guide 1, here of circular cross section for convenience, although obviously other shapes are not excluded. The dielectric lens 2, which has a cylindrical body portion fitting into the front end of the wave guide, a conical forward end 3 and a "fish-tail" rear end 4, aids in receiving the ultra-high-frequency radiant energy and feeding it into the wave guide efficiently.

The detector, designated as a whole by reference character 5, is built into the wave guide 1 as shown, and beyond said detector 5 there is a suitable termination of the wave guide, here shown as the end closure 6. Certain conditions must be observed in dimensioning and locating the various parts above mentioned, to make them efficient at the particular wave length in use, but these are well known, and are not discussed here, as they form no part of the present invention.

Referring next to FIGS. 2, 3, 4 and 5, the detailed structure of the detector will be described. A metallic body member 7 has annular seats 8 formed in opposite faces thereof, to receive circularly corrugated annular flexible metallic supports 9, which are sealed vacuum-tight into said seats 8 at their outer rim portions 10, and which carry the glass windows 11, said glass being likewise fused or otherwise sealed vacuum-tight into the central parts of said supports 9.

Openings or irises 12, in axial alinement with the wave guide 1, are provided in the body member 7, in substantial register with the windows 11. These openings 12 lead into a cylindrical cavity 13, best shown in FIG. 4. The bottom wall of said cavity 13 consists of a circularly corrugated flexible metal diaphragm 14, likewise sealed vacuum-tight at its periphery to the body member 7. The top wall of the cavity 13 is formed by a plane metallic flange 15, integral with the conical grid member 16, which will be described later.

In order that this cavity or chamber 13 may be evacuated, a passage 17 is provided, in communication with the bore 18, a metal tube 19 being fitted into said bore 18 and sealed hermetically into the body 7. After evacuation of the cavity, this tube 19 may be crimped shut, as shown at 20 in FIG. 1, and sealed vacuum-tight, as by solder or equivalent material.

Figure 2:
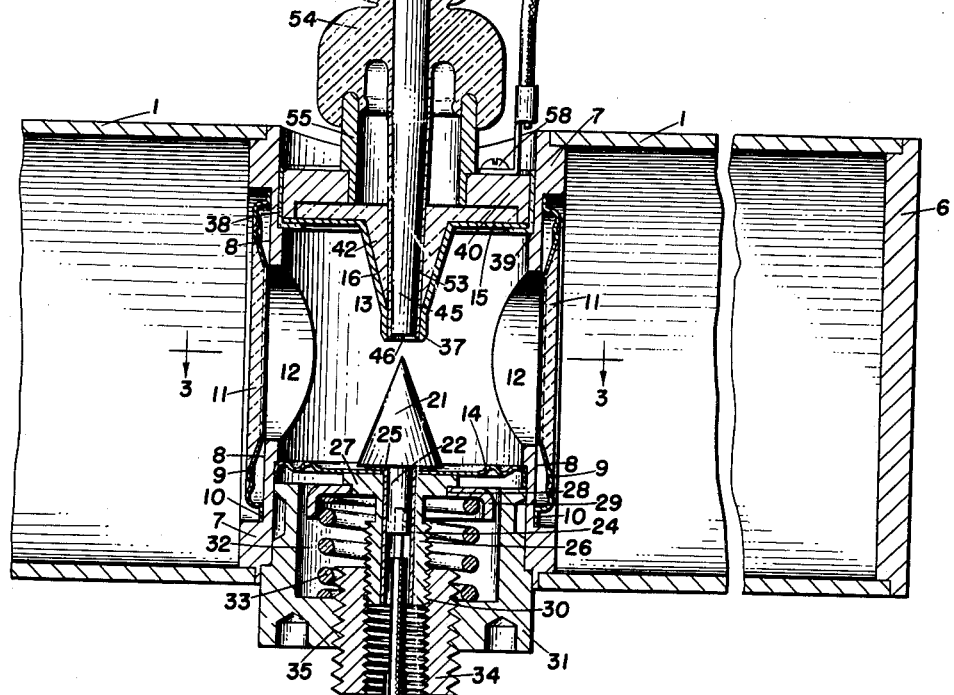
FIG. 2 is an enlarged axial section through the detector and adjacent fragmentary portions of the wave guide in which said detector is mounted, with several of the elements of the detector shown in elevation.

The anode 21 of the detector is cone shaped, and is mounted on, but insulated from, the corrugated diaphragm 14, already mentioned. As shown in FIG. 2, the cone 21 may be a solid piece of metal, with a stem 22 extending therefrom, affording means for securing the cone in place, as well as providing a convenient means for attaching the anode lead 23 to said cone.

Insulation consisting of a tubular portion 24 and a radial flange 25, may be placed as shown, to insulate the anode from the diaphragm 14 and other grounded parts. This insulation may be any desired vacuum-tight dielectric material that is refractory enough to withstand the degassing of the detector by heat treatment, and is of good electrical quality.

The purpose of the flexibility of diaphragm 14 is to make it possible to adjust the cone 21 in the direction of its axis, while maintaining the vacuum in cavity 13. This is accomplished by providing the tubular stem 26, surrounding the insulating tube 24 and having a radial flange 27 at its upper end, abutting against and secured to the under side of the central part of diaphragm 14, as shown.

This flange has a portion 28 of somewhat reduced diameter, which affords a seat for a cup-shaped washer 29.

External threads 30 are provided on the tubular stem 26. A plug 31 having a cavity 32 therein is fitted into a hole in the body 7, as shown in FIGS. 2 and 4, after the contents of said plug have been assembled. The plug may be held securely by the two socket head set screws 36, 36. The contents of the plug 31 include, in addition to items 24 to 29 inclusive, already described, the helical spring 33 and the tubular member 34, which is threaded inside and outside, as shown, the inner threads fitting on the threads of stem 26, while the outer threads fit in a threaded bore 35 of the plug 31. A slight shoulder is formed in bore 13 to act as an abutment, to position the diaphragm 14 at a predetermined suitable location, such that the vertex of the cone 21 will lie at or near the center of the cavity 13.

It will be noted, however, that the threads 30 on the inside, and the threads 35 on the outside of member 34 are of different pitch, whereby rotation of the tubular member 34 will cause the stem 26 to move at a differential rate in the direction of the axis of the anode cone 21, thus raising or lowering said cone relatively slowly, to afford a delicate adjustment of the position of its tip with respect to the cathode-grid structure, which will now be described.

Referring now to FIGS. 2, 4 and 5, there is shown a top closure for cavity 13 that consists of the grid-supporting flange 15 from which extends the grid cone 16 whose lower edge portion 37 constitutes the grid proper.

In order to provide a hermetic seal at the top of cavity 13, without grounding the grid cone flange 15, insulation 38 is provided as shown, resting on the shoulder 39 formed in the body 7. Unlike the anode cone 21, the grid cone 16 is hollow, so that the cathode can be located within it, as shown in FIGS. 2, 4, 5 and 6. The metallic cup-shaped upper closure 40 has a peripheral downwardly extending flange 41 resting on the outer edge of grid flange 15, and a refractory insulator 42 is provided to fit in and fill the intervening space. The insulation 38, which may be of a vitreous nature, is fused in place, to provide a vacuum seal between closure 40 and body 7.

The cathode assembly as a whole is designated by reference character 43, and comprises a tube 44, which may be tapered through a portion of its length as at 45, and carries the cathode 46 at its lower end. The cathode assembly includes also a heater 47 adjacent the cathode 46 and insulated leads 48 and 49 connected to the terminals of said heater, to supply the heater current thereto. A filler 50 of any suitable refractory insulating material is provided, to embed the heater and the adjacent ends of said lead wires 48 and 49, and is confined to the lower end of the cathode tube by the partition 51, through which the leads pass as shown, and from which they are insulated by the fused beads 52, said partition and the fused seals thus forming a vacuum seal in the end 45 of the cathode tube. A small hole 59 is provided in the tube, to permit evacuation of the space enclosed below 51.

A sheath of insulation 53 is interposed between the lower tube portion 45 and the part of the grid cone 16 that surrounds its lower end, to prevent short circuiting the cathode to the grid. The upper end of the cathode tube 44 is held in place by a vitreous seal and support 54 fused to the outside of the tube 44 and to the top portion of a short tubular flange 55, held by, or integral with, the cup-shaped closure 40.

The heater leads 48 and 49 are housed within the tube 44, and emerge through its open upper end as illustrated. The cathode lead 56 is secured to the upper free end of the tube 44, as by welding or other means. The grid lead 57 is connected to the grid cone through the closure member 40, as by the screw 58 shown in FIG. 2.

The exposed lower surface of the cathode 46 will be treated, to increase its electron-emitting power, in any conventional way, as by use of alkaline earth metal coatings, etc. It will be noted from FIG. 5 that this active cathode surface is made slightly concave, which is done to compensate for the two conditions, first that the center of the cathode, being more remote from the surrounding grid 37, would be less subject to control thereby, which is offset by also increasing the distance from the tip of the anode 21, and second, that because the effective part of the anode is substantially a mere point, a more nearly uniform cathode-anode distance is attained by making the cathode concave.

It will also be observed that the grid 37 projects out slightly beyond the general plane of the cathode. This causes all the electrons emanating from the cathode to pass through the ring-shaped grid 37. Incidentally, it must be remembered that all the figures except FIG. 1 show the structures on the enlarged scale, and that preferably the inside diameter of the grid 37 is of the order of 0.06" to 0.12", thus bringing the grid much closer to the cathode than would appear from FIG. 5, and giving the grid an effective control of the emitted electrons. It should also be kept in mind that the terms "up" and "down" are purely relative, as the detector may be used in any desired position.

The operation of the invention is as follows:

The stream of electrons between the cathode and anode is held at less than critical concentration so that it does not reflect the wave energy. This is in contrast to the desired conditions in the gas filled attenuating tube of the present inventor's earlier application for patent, Serial No. 792,465, filed Dec. 18, 1947, now Pat. No. 2,570,893, wherein reflection of the wave energy was required. In the present case the complete penetration of the wave through the electron stream is desired, so as to permit all the electrons in the stream to be affected dynamically by all the wave energy.

Neglecting for the present the resonant cavity, the flow of electrons, emanating from cathode 46, would be formed into a thin stream by the grid lip 37. The irises 12 may be considered as concentrating upon this electron stream the energy of the wave to be detected, so that all the wave energy will act on all the electrons. The potential of the wave is further concentrated across the gap between the cones constituting the anode and the grid, so that during the transit of the electrons to the anode, the electron motion will be strongly affected or modulated by the wave potential. This results in a variation of anode current or a variation in potential across capacitor 65, FIG. 6. Detection of the wave occurs, such as may be observed also in diode detectors for micro waves.

Now let the presence of the tuned resonant cavity be taken into account. The grid-to-cathode capacitance is high enough to cause these two electrodes to be at essentially the same radio frequency potential. This provides the feed back circuit that exists in ordinary oscillators. The tuned cavity provides the equivalent of what would be the tuned circuit in ordinary oscillators. The negative feed back required for these to operate is obtained by locating the cathode emitting surface sufficiently far back of the grid that the average electron transit time will be a half cycle, or an odd number of half cycles. With the application of strong anode and grid fields the tube possesses all the necessary elements to oscillate at the frequency to which the cavity is tuned. This is the local oscillator frequency of a superheterodyne receiver. The wave to be detected is at a slightly different frequency, and the mixing, in the cavity, of these two frequencies establishes a beat or intermediate frequency which the capacitor 65 detects as a modulation of the local oscillator wave. The tube thus operates as a superheterodyne receiver.

Now, if the cavity is tuned to the frequency of the wave to be detected, the tube provides the elements of a regenerative detector. To prevent spontaneous oscillation, the C-battery, constituting the source of grid potential in line 57, may be reduced in voltage or replaced by a conventional grid leak resistor, and the anode potential may be adjusted so that the average electron transit time is not a multiple half period. The introduction of a wave into the cavity will thus cause certain of the electrons either to slow down or to accelerate sufficiently to couple the anode potential to that of the wave, and the resonant cavity aiding, the tube adds its oscillation to that of the exciting wave and operates as a regenerative detector, with all the advantages and defects of this type of detector.

In this regenerative type of detector, instability is usually encountered when the device is adjusted for maximum gain. That is, a small signal may cause the detector to pass into strong self-sustained oscillation.

The use of automatic gain control, to limit a powerful signal to the proper value for the amplifier that usually follows detectors, is well known. In the present tube this action may be obtained readily by causing the flow of electrons to the anode to be limited, so that their cumulative effect will remain within acceptable limits, as far as the amplifier following the capacitor 65 is concerned. Such an action is obtainable by causing a feed back from the first stage of amplification to drive the grid 37 either so negative that fewer electrons can escape through the grid field to the anode, or sufficiently positive to capture on the grid enough electrons to limit the number of electrons reaching the anode. Both systems have been used with acceptable results. It may be noted at this point that conventional triode grids are usually relatively delicate structures, and could not successfully withstand the heating that would result from sustained positive bias, with the resultant heavy grid current. The grid of the present device is however relatively massive and would not be injured by positive bias. Needless to remark, automatic gain control could not be secured at all, when a crystal detector was used, as heretofore customary.

The feed back of this controlling potential is generally delayed, so as not to affect the modulation over a short period of the incoming signal. If this feed back is accelerated to some lower frequency than that of the incoming wave, the quenching means necessary for super-regenerative reception is obtained. In the present device this quenching action becomes extremely powerful, as it is necessary to disturb only slightly the electron transit time, to dampen self-oscillation of the detector.

The detailed operation of one type of circuit embodying the principles of the invention will now be discussed, with particular reference to FIG. 6. The cathode 46 is heated by the heater 47, energized from a suitable source 60 of electricity, through the conductors 48 and 49. The cathode is connected to ground, which in the present instance is the wave guide 1 itself, through conductor 56, in series with which may be provided optionally a "biasing," cathode resistor 61. However the grid 37 may equally well be given a bias by the "C" battery, or by a combination of both a cathode resistor and a bias battery, or a conventional grid leak may be used, the choice depending largely upon convenience.

The grounded conductor 1, here the wave guide itself, is connected also to the negative terminal of the anode-power source, shown as the "B" battery whose positive electrode is connected through conductor 62, anode load resistor 63 and conductor 23, to the anode 21. It will be seen that this is substantially the same as the conventional triode circuit, and no particular novelty exists therein aside from the structure and operation of the detector tube itself. Usually an amplifier such as 64 is connected, with conductors 1 and 23 as its input leads, and ordinarily an isolating capacitor such as 65 is also required. The output of the amplifier 64, delivered through conductors 1 and 66, may operate any desired device, such as an oscilloscope, servo-motor, and the like, this also being no part of the present invention.

The detector is sensitive to the gap spacing between the anode and cathode, and consequently it is desirable to provide adjustment for this distance. This has already been described, and it will suffice here to state that such adjustment may be made readily by turning the threaded tube 34, FIGS. 2 and 4.

The location of the cathode surface is a matter of considerable importance. With a grid diameter of one-sixteenth to one-eighth of one inch, a suitable position of the active surface of the cathode 46 is depressed about one two-hundredths of an inch from the plane of the edge of the grid 37. The triode assumes a state of oscillation, at approximately the natural or resonant frequency determined by the tuned cavity 13, and the grid depression should be such that the emitted-electron travel through this depression requires the time of one half-cycle.

The spacing of the vertex of the anode 21 from the grid plane is also important, and should preferably correspond to an odd number of half-cycles, that is, an odd number times the depression above defined. The anode-cathode spacing, however, has no direct effect on the self-oscillation already mentioned.

This self-oscillation has a desirable effect in the detection, in that the received energy will heterodyne therewith, thus providing the advantages associated with superheterodyne and/or superregenerative circuits, particularly, greatly increased response to a given signal strength. The beat frequency resulting will determine the design of the amplifier 64 that will be best suited to amplify such signals.

The detector is, of course, much more sensitive than the crystals commonly used, due to the triode effect, and this sensitivity is further enhanced by the superregeneration and/or superheterodyne effect.

A second very important advantage of the present triode is that it is not subject to injury by an overload in the form of excessively great signal input. The crystal detector, on the contrary, is extremely easily damaged by excessive signal strength, and will be destroyed entirely by a relatively small overload, such as may result from having the receiver too close to the transmitter. Usually an attenuator of some sort is associated with the crystal receiver, to prevent injury thereto. This complicates the receiver, and makes it more bulky and costlier, and nevertheless does not afford absolute protection. The elimination of such attenuator is thus a very important advantage of the present invention.

Obviously many modifications and variations of the present invention are possible in the light of the above teachings. Therefore it is to be understood that within the scope of the appended claims the invention may be practiced otherwise than as specifically described.

I claim:

1. An electronic device comprising a resonant cavity, a pair of substantially conically shaped electrodes supported by said resonant cavity, said electrodes having their apices pointing toward one another and projecting into said cavity, means electrically insulating said electrodes from said cavity, one of said electrodes having an opening at its apex, and a thermionic electron emitting cathode supported by said cavity within the electrode having an opening, so that the edge of said opening constitutes a control electrode for said electrons.

2. A device as defined in claim 1, wherein said cathode comprises a tube extending into the cone with the open apex, said tube having an indirectly heated emissive surface at its end, adjacent said apex.

3. An electronic device comprising a body forming an evacuated resonant cavity having a flexible wall, electrodes projecting into said cavity, one of said electrodes having a stem extending through said wall, insulating means inserted between said electrode and said flexible wall, a fixed support carried by said body adjacent said flexible wall, said support having a threaded opening therein, a first tubular member having internal and external threads of different pitch received in said threaded opening, a second tubular member having external threads engaging the internal threads of said first tubular member, the stem of said electrode being received in said second tubular member, and a spring positioned about said tubular members and bearing against said flexible wall and said fixed support whereby the flexible wall carrying the electrode may be moved to vary the distance between said wall and said fixed support.

4. In combination with a conductor for microwave energy, a detector for energy passing through the conductor comprising a triode having a resonant cavity communicating with the conductor, said triode having a thermionic electron emitting electrode, a control electrode adjacent said emitting electrode, and an anode, said electrodes being supported by said resonant cavity and extending into said cavity.

5. In combination with a hollow conductor for microwave energy, a metallic evacuated body member forming a resonant cavity supported by said conductor, said body member having windows axially alined with said conductor, a pair of conically shaped electrodes projecting into said cavity, one of said conically shaped electrodes having an opening in its apex, and a thermionic electron emitting surface supported adjacent the opening in said electrode.

6. In combination with a waveguide, a hollow metallic evacuated body member forming a resonant cavity supported within said waveguide, said body member having openings axially alined with said waveguide, windows in said body member closing said openings, said body member having a flexible wall, a conically shaped anode electrode carried by said flexible wall, said anode having its apex extending into the cavity transversely of said openings, a conically shaped control electrode supported by said body, said control electrode having an opening adjacent its apex, the apex of said control electrode extending into said cavity toward the apex of the anode electrode, an indirectly heated thermionic electron emitting electrode positioned within the electrode having the opening at its apex, and means insulating said electrodes from each other and from said metallic body, so that the opening in said control electrode will control the stream of electrons between said electrodes.

7. In combination with a hollow conductor for microwave energy, means for generating local oscillations, said means being carried in said conductor, said means including a metallic evacuated body forming a resonant cavity, an anode, a control electrode, and a thermionic electron emitting electrode projecting into said cavity, windows provided in said body axially alined with the hollow conductor thereby permitting the wave energy passing through the conductor to be coupled with the local oscillations to provide a beat frequency, and means for detecting the beat frequency.

8. In combination with a hollow conductor for microwave energy, means for generating local oscillations, said means being supported by said hollow conductor, said means including a resonant cavity oscillator having windows provided therein to permit the wave energy in said conductor to couple with the local oscillations in said resonant cavity to provide a beat frequency, and means for detecting said beat frequency.

References Cited in the file of this patent

UNITED STATES PATENTS

| | | |
|---|---|---|
| 1,986,081 | Streiffert | Jan. 1, 1935 |
| 2,079,163 | Gardner et al. | May 4, 1937 |
| 2,143,671 | Zottu | Jan. 10, 1939 |
| 2,153,728 | Southworth | Apr. 11, 1939 |
| 2,207,905 | Weagant | July 16, 1940 |
| 2,355,795 | Glass | Aug. 15, 1944 |
| 2,404,116 | Wolowicz et al. | July 16, 1946 |
| 2,412,998 | Litton | Dec. 24, 1946 |
| 2,419,903 | McCarthy | Apr. 29, 1947 |
| 2,427,089 | Clifford | Sept. 9, 1947 |
| 2,439,387 | Hansen et al. | Apr. 13, 1948 |
| 2,453,078 | Posthumus | Nov. 2, 1948 |
| 2,454,741 | McCarthy | Nov. 23, 1948 |